United States Patent Office 2,994,584
Patented Aug. 1, 1961

2,994,584
STABILIZED SULFURIC ANHYDRIDE AND PROCESS FOR ITS MANUFACTURE
Friedrich Wolf, Leipzig, Germany, assignor to VEB Farbenfabrik Wolfen, Bitterfeld, Germany
No Drawing. Filed Mar. 16, 1959, Ser. No. 799,477
Claims priority, application Germany Sept. 17, 1958
5 Claims. (Cl. 23—174)

The present invention relates to the stabilization of liquid sulfuric anhydride.

Pure 100% sulfuric anhydride is a solid compound at room temperature. For many industrial purposes, however, it is desirable to use the anhydride in liquid state, since some operations are simplified thereby.

Sulfuric anhydride is known to crystallize in several forms when passing from the liquid into the solid state. The known forms are alpha, beta and gamma $SO_3$. In order to avoid crystallization of $\beta$-$SO_3$, or of $\alpha$-$SO_3$, which forms by transformation from the beta variety, it is necessary to maintain the temperature at about 35° C. This is an inconvenience in many instances, when working at room temperature is preferred.

To overcome this drawback it has already been suggested to add a stabilizer to the liquid sulfuric anhydride, i.e., a compound, which effects stabilization of $SO_3$ in its gamma form, that has a melting point of about 16° C. When thus stabilized, the anhydride will only crystallize at temperatures below 16° C. and will be in liquid form at room temperature as desired for many purposes.

Known stabilizers for $SO_3$ are: Boric acid and its derivatives; thionyl chloride; dimethyl sulfate, fatty acids and their anhydrides; titanium and antimony compounds; silicon oil or silicon halides, and derivatives thereof. As mentioned before, the addition of these stabilizers will maintain $SO_3$ in liquid state down to about 16° C. If a depression of the freezing point is desired to a yet lower temperature, the known stabilizers are insufficient.

It is an object of the present invention to provide a stabilizer for $SO_3$, which when added to the liquid anhydride will maintain it in liquid state below the freezing point of gamma-$SO_3$, or, in other words, which are capable of depressing the F.P. to below 16° C.

It is another object of the invention to provide $SO_3$ as a stabilized liquid which will not crystallize at normal temperature due to the addition thereto of a very small quantity of a stabilizer which is inexpensive and readily available.

Other objects and advantages of the invention will become apparent from the following detailed description.

I have discovered that low molecular aliphatic ethers are excellent stabilizers for liquid $SO_3$. The ethers may be simple (or symmetric) ethers, or they may be mixed ethers. More particularly I may mention diethyl ether, methyl ethyl ether, dimethyl ether, which are very well suited as stabilizers. A small quantity, calculated on the total weight of the liquid mass, more particularly a quantity from 0.1% to 0.5%, will lower the freezing point of $SO_3$ considerably, for instance by about 5° C., which for most purposes is very satisfactory.

The extent of the depression of the F.P. of $SO_3$ in any individual case will depend on the amount of the stabilizer added. The type of $SO_3$ crystals which crystallize from the soldifying mass, are likewise dependent on the amount of stabilizer.

The above mentioned stabilizers are not only effective in 100% pure $SO_3$, but will also act as melting point depressants for oleum of high $SO_3$ percentage, e.g. 95% oleum.

It should be understood that the added stabilizer must be completely anhydrous.

In the following, the invention will be more fully described in a specific example, but it should be understood that this is given by way of illustration and not of limitation and that many changes can be made in the details without departing from the spirit of the invention.

*Example*

99.5 parts by weight of 100% $SO_3$ are mixed at room temperature with 0.5 part by weight diethyl ether (anhydrous). Upon cooling, the liquid starts to solidify at 12° C. and has congealed completely at 4° C. The crystallized product consists of about 50% gamma $SO_3$, the other 50% are $\alpha$-$\beta$-$SO_3$.

When the mixture is remelted, about 50% thereof have liquefied at 21° C., the remaining mass melts between 34 and 45° C.

If instead of 100% $SO_3$ oleum containing 95% $SO_3$ is used, very good stabilizing results will likewise be achieved.

As a general rule, it can be stated that upon addition of 0.1% by weight to the sulfuric anhydride the congealing point of the $SO_3$ will be between 7 and 5° C.; at an addition of 0.2% by weight of the ether, the congealing point will be between 10 and 6° C.; and at an addition of 0.5% by weight, the congealing point will be between 12 and 6° C.

With increasing addition of ether, the gamma form of $SO_3$ will be reduced to 20%, the remaining mass being $\alpha,\beta$-$SO_3$. Furthermore, with increasing addition of the ether, the solution will turn brown. It is therefore not advisable to use larger amounts of $SO_3$.

What is claimed is:

1. A stabilized sulfuric anhydride remaining in liquid phase at room temperature containing as a sole additive an addition of an anhydrous ether selected from the group consisting of diethyl ether and ethyl methyl ether in an amount ranging from 0.1 to 0.5% by weight of the liquid mass.

2. A stabilized sulfuric anhydride remaining in liquid phase at a temperature below 16° C., being substantially 100% pure $SO_3$ and containing as a sole additive an addition of anhydrous diethyl ether in an amount of 0.1 to 0.5% by weight of the liquid mass.

3. A stabilized sulfuric anhydride remaining in liquid phase at a temperature below 16° C., being 95% oleum and containing as a sole additive an addition of 0.1 to 0.5% by weight of the liquid mass of anhydrous diethyl ether.

4. A process for making a stabilized sulfuric anhydride remaining in a liquid phase at room temperature, which comprises adding to sulfuric anhydride from 0.1 to 0.5% by weight of anhydrous diethyl ether.

5. A process for making a stabilized sulfuric anhydride containing substantially 100% $SO_3$ which comprises adding to 99.5 parts by weight of the anhydride 0.1 to 0.5% by weight of anhydrous diethyl ether at room temperature.

References Cited in the file of this patent
UNITED STATES PATENTS
2,833,625 Pick _____ May 6, 1958